Nov. 10, 1936.　　　　G. N. PULLEY　　　　2,060,242
APPARATUS FOR DEAERATING LIQUIDS
Filed July 11, 1936
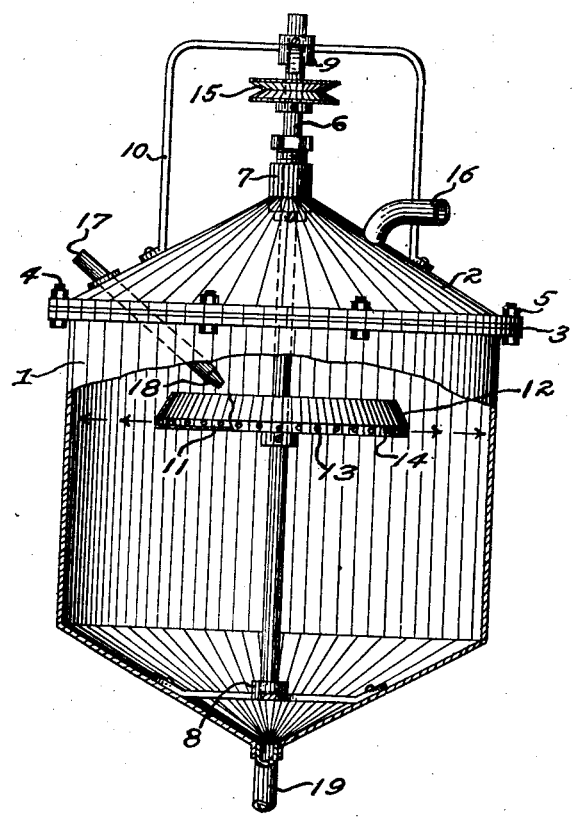
Inventor
G. N. PULLEY
By [signature]
Attorney Patented Nov. 10, 1936

2,060,242

UNITED STATES PATENT OFFICE 2,060,242

APPARATUS FOR DEAERATING LIQUIDS

George N. Pulley, Winter Haven, Fla., dedicated to the free use of the People of the United States Application July 11, 1936, Serial No. 90,153

1 Claim. (Cl. 183—2.5)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

I hereby dedicate the invention herein described to the free use of the people of the United States to take effect on the granting of a patent to me.

This invention relates to the removal of gases from liquids by subjecting liquids to centrifugal force while in a vacuum. The object of this removal of gases, particularly in the case of fruit juices, is to increase the keeping qualities of such fruit juices. It is well known, for instance, that oxygen increases the deterioration of certain fruit juices, encourages the formation of "off-flavors" and aids in the destruction of vitamin C. Oxygen also increases the corrosion of metal containers containing these juices.

The accompanying drawing, consisting of one sheet, represents the preferred form of my apparatus. Referring to the drawing, it will be seen that tank 1 is cylindrical in shape and should be constructed of stainless steel or other non-corrosive metal, of sufficient gauge to withstand a vacuum of from 28 to 29". The upper part of tank 1 is provided with a cover 2 which is easily removed therefrom, for the purpose of thoroughly cleaning the tank. The joint 3 between tank 1 and cover 2 is made air-tight by means of a gasket (not shown), and suitable bolts 4 and nuts 5, by means of which the cover 2 may be easily removed. A shaft 6, also composed of stainless steel or other material, passes through cover 2 and into tank 1. The entrance of shaft 6 through cover 2 is rendered air-tight by means of a suitable packing gland 7. The lower end of shaft 6 is supported by bearing 8 and its extreme upper end by another bearing 9 and a bearing support 10. Bearing support 10 may also be used as a convenient means of lifting cover 2 from tank 1 in order to facilitate the cleaning of the latter. Also attached to shaft 6 is a saucer-shaped revolving disc 11 of stainless steel or other non-corrosive metal with its rim 12 inclined inwardly at about 60° and provided with a series of holes 13 at its outer periphery where the rim 12 and the bottom 14 meet.

Disc 11 is made to revolve at about 1700 R. P. M., by means of a motor and belt (not shown), connected with a grooved pulley 15 mounted on shaft 6.

The approved manner of operating my apparatus is as follows: Means of creating a vacuum, either a pump or steam ejector, is attached to vacuum connection 16, and when a vacuum within tank 1 has reached 28 or 29", as indicated by a suitable gauge attached to same, but not shown, the liquid to be de-aerated and at a temperature not higher than 85° F., is introduced at inlet 17 through the nozzle 18 in such a way that the liquid impinges upon the revolving disc 11 at a point near its center. By centrifugal force the liquid is thrown outward through the small holes 13 in disc 11 which tend to shear the gas bubbles. The liquid is now in the form of a mist, which runs down the walls of tank 1 and finds egress through outlet 19 into a suitable container (not shown).

It has been found that at least 86 per cent of the residual gas in a fruit juice can be removed in this manner.

Having thus described my invention, what I claim for Letters Patent is:

An apparatus for de-aerating liquids by centrifugal force under reduced pressure, comprising a tank; a cover detachably affixed to said tank; a shaft extending through said cover and into said tank; means for retaining said shaft in position; a cup-shaped disc mounted on said shaft and having holes formed in the outer periphery thereof; means for revolving said shaft and disc; a vacuum connection mounted on said cover, and means adapted for the intake and outlet of liquids.

GEORGE N. PULLEY.